Figure 1:
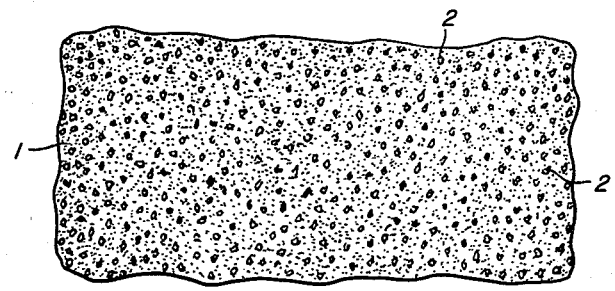

Sept. 29, 1964   H. S. LINK ETAL   3,150,937
ANTI-SKID TREAD PLATE
Original Filed March 27, 1958

INVENTORS
HAROLD S. LINK and
WILLIAM H. SCHULTZ
By Donald G. Dalton
Attorney 3,150,937
ANTI-SKID TREAD PLATE
Harold S. Link and William H. Schultz, both of Pittsburgh, Pa., assignors to United States Steel Corporation, a corporation of New Jersey
Original application Mar. 27, 1958, Ser. No. 724,476, now Patent No. 3,017,689, dated Jan. 23, 1962. Divided and this application July 31, 1961, Ser. No. 127,918
1 Claim. (Cl. 29—191)

This in a divisional application that is directed to subject matter divided out of our co-pending application, Serial No. 724,476, filed March 27, 1958, now Patent No. 3,017,689, which was a continuation-in-part of application Serial No. 443,594, filed July 15, 1954, now abandoned.

The invention of this application resides, as indicated, in an anti-skid tread plate of laminated construction that is comprised of a base layer in the form of a steel plate or sheet, an intermediate layer or hot-dipped coating of aluminum bonded to the base layer, and an anti-skid tread surface layer composed of abrasive particles that are at least partially embedded and anchored in the aluminum coating metal, as shown and described in the accompanying drawings and the following description.

Figure 2:
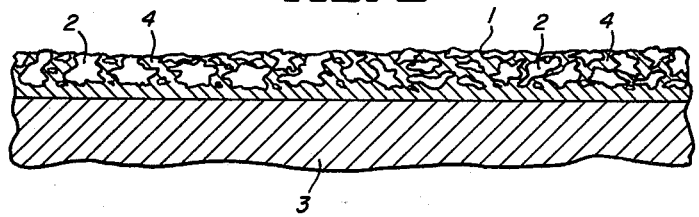

In the drawings:

FIGURE 1 is a fragmentary plan view illustrating somewhat diagrammatically a tread plate constructed in accordance with the principles of this invention; and FIGURE 2 is a sectional view showing diagrammatically the laminated construction of the tread plate shown in FIGURE 1.

As shown in the drawings, the tread plate of this invention has a tread surface 1 comprised of a layer of abrasive particles 2. It has in effect a laminated construction comprised of a steel base 3 in the form of a steel sheet or plate, a hot-dipped coating or layer 4 of aluminum bonded with the steel base 3, and the tread surface layer of abrasive particles 2, the abrasive particles 2 being embedded in the aluminum layer 4 and being secured thereby to the base layer 3. The particles 2 are preferably embedded in the aluminum coating 4 by being projected or sprayed against its outer surface while it is in a molten or semi-molten condition. By reason of the soft condition of the aluminum layer 4 the inertia of the abrasive particles at the time of their impact therewith is effective to embed them in the aluminum metal. As shown in FIGURE 2, most of the particles are completely embedded in the aluminum and the remaining particles are at least partially embedded therein. With reference to the partially embedded particles it will be noted that the aluminum has flowed over the edges of such particles and into the interstices therein and is effective to securely anchor them against movement away from the base plate. In this respect, and since some of the surface abrasive particles 2 are partially covered by the coating metal, it will be apparent that the tread surface 1 may be comprised in part of the coating metal 4.

A preferred method and apparatus for producing the tread plate described above forms the subject matter of Patent No. 2,964,419, which issued out of application Serial No. 724,362, filed concurrently on March 27, 1958, with the above mentioned co-pending application, and is also shown and described in the latter application. In view of these showings, it will be sufficient for the purpose of this invention to indicate that such apparatus comprises a conventional coating apparatus, which includes a coating pot for a molten bath of aluminum coating metal through which a steel sheet or plate is passed and withdrawn vertically to apply a coating of aluminum thereto, but which omits the usual exit rolls customarily used to control coating thickness in conventional coating operations, and an air or gas spray unit for projecting the abrasive particles against the aluminum coating at the point where it emerges from the coating bath. The omission of the exit rolls and the use of an air blast for projecting the abrasive particles 2 against the coating metal result in thicker coverings of coating metal 4 compared to those produced by conventional coating operations.

The thickness of the aluminum coating 4 applied to the steel base 3 must be sufficient to provide an effective anchorage against dislodgement of the abrasive particles 2. For this purpose the coating metal is applied according to the principles of this invention to the base 3 in an amount providing a coating 4 having a thickness of from 0.0033 inch to 0.01 inch. Generally stated the thickness of the coating 4 cannot be decreased below the lower limit 0.0033 inch and still obtain an effective anchorage for the abrasive particles, and the heavier coatings provide an improved anchorage for the abrasive particles 2 and enable the use of abrasive particles of larger size.

Any of a number of abrasives, which are available on the market and have the hardness required to produce wearability, may be used as the particles 2. Typical of such abrasives are the materials flint shot, alundum or aluminum oxide, carborundum, emery, corundum, tungsten carbide, silicon carbide, and the like. Most of these materials have rough surfaces which are effective to provide a secure anchoring connection in the aluminum coating 4 when embedded therein before it has solidified by cooling. The mesh size of the particles 2 may be varied in accordance with the type of anti-skid surface desired, the smaller mesh sizes forming smoother surfaces and the larger sizes providing rougher surfaces. The particles may be of mixed sizes and a satisfactory tread surface will be provided by a mixture of particles varying from 20 to 80 mesh. In this respect abrasives with a particle size of from 36 to 60 mesh is preferred from the standpoint of a surface of satisfactory roughness and in which the particles have a good anchored connection in the coating metal. Generally stated, the upper limit of particle size is determined by the thickness of the coating metal layer 4 since there must be sufficient coating metal for the particles to be embedded therein to a depth providing an adequate anchoring connection therefor. If excessively large particles are used on thin coatings, the particles will project above the surface of the coating metal to an extent such that they may break away or be gouged out of the relatively soft coating metal in the course of normal use and the particle size must therefore be selected according to the thickness of the coating metal to avoid this condition. In general, larger sizes of particles require thicker layers of coating metal.

While the anti-skid properties of the tread surface increase with the density of the particles 2 in the coating 4, the quantity of abrasive is limited by the number of particles that can be anchored in the coating metal. Using alundum in the production of tread plates, satisfactory tread surfaces are produced by applying the particles 2 in quantities from 0.5 to 2.0 ounces per square foot of tread surface area, about 1.0 ounce per square foot being adequate for good anti-skid properties and being preferred.

While one embodiment of our invention has been shown and described it will be apparent that other adaptations and modifications may be made without departing from the scope of the following claim.

We claim:

An anti-skid tread plate comprising a steel base providing a tread surface area on one side thereof, a hot-dipped coating of aluminum covering said area in an amount providing a thickness of from 0.0033 inch to 0.01 inch, and abrasive particles of a mixed size from 20 to 80 mesh uniformly distributed over said coating area, said particles being embedded in and substantially entirely covered by the aluminum in said coating and being anchored thereby against movement relative to said steel base.

References Cited in the file of this patent
UNITED STATES PATENTS 2,676,393     Lieberman             Apr. 27, 1954
2,752,268     Whitfield et al.         June 26, 1956